US008656273B1

(12) United States Patent
Tifford et al.

(10) Patent No.: US 8,656,273 B1
(45) Date of Patent: Feb. 18, 2014

(54) UNIFIED DATA ENTRY FOR GENERATING MULTIPLE FORMS

(75) Inventors: Alan Tifford, San Diego, CA (US); Dave Curtis Barrett, Chula Vista, CA (US); Bennett R. Blank, San Diego, CA (US); Kenchi Mori, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 638 days.

(21) Appl. No.: 12/499,057

(22) Filed: Jul. 7, 2009

(51) Int. Cl.
*G06F 3/00* (2006.01)

(52) U.S. Cl.
USPC ............... 715/226; 715/221; 715/224; 705/3

(58) Field of Classification Search
USPC ............... 715/226, 224; 705/1.1, 3; 702/180
See application file for complete search history.

(56) References Cited

U.S. PATENT DOCUMENTS

| 6,202,052 | B1 * | 3/2001 | Miller | 705/31 |
|---|---|---|---|---|
| 6,446,048 | B1 * | 9/2002 | Wells et al. | 705/35 |
| 6,460,042 | B1 * | 10/2002 | Hitchcock et al. | 1/1 |
| 6,684,188 | B1 * | 1/2004 | Mitchell et al. | 705/3 |
| 6,697,787 | B1 * | 2/2004 | Miller | 705/31 |
| 7,272,633 | B2 * | 9/2007 | Malik et al. | 709/206 |
| 7,334,187 | B1 * | 2/2008 | Stanciu et al. | 715/222 |
| 7,403,942 | B1 * | 7/2008 | Bayliss | 707/748 |
| 7,565,312 | B1 * | 7/2009 | Shaw et al. | 705/31 |
| 7,669,116 | B2 * | 2/2010 | Lopata et al. | 715/224 |
| 7,734,995 | B1 * | 6/2010 | Saikaly | 715/200 |
| 7,742,958 | B1 * | 6/2010 | Leek et al. | 705/31 |
| 7,966,561 | B1 * | 6/2011 | Nguyen et al. | 715/277 |
| 8,150,156 | B2 * | 4/2012 | Geva et al. | 382/175 |
| 8,190,499 | B1 * | 5/2012 | McVickar | 705/31 |
| 8,190,988 | B2 * | 5/2012 | Eckelman et al. | 715/223 |
| 2002/0133410 | A1 * | 9/2002 | Hermreck et al. | 705/19 |
| 2003/0061131 | A1 * | 3/2003 | Parkan, Jr. | 705/30 |
| 2004/0078307 | A1 * | 4/2004 | Carver | 705/31 |
| 2006/0010050 | A1 * | 1/2006 | Dowdell | 705/31 |
| 2006/0026083 | A1 * | 2/2006 | Wyle | 705/31 |
| 2006/0178961 | A1 * | 8/2006 | Stanley et al. | 705/31 |
| 2006/0271451 | A1 * | 11/2006 | Varughese | 705/31 |
| 2007/0129987 | A1 * | 6/2007 | Hauser et al. | 705/9 |
| 2007/0168861 | A1 * | 7/2007 | Bell et al. | 715/701 |
| 2007/0198910 | A1 * | 8/2007 | Jensen et al. | 715/505 |
| 2008/0071673 | A1 * | 3/2008 | Howard et al. | 705/38 |

(Continued)

OTHER PUBLICATIONS

TurboTax Products Tax Year 2007, Intuit Inc., 2007 Edition, pp. 1-25.*

(Continued)

*Primary Examiner* — Stephen Hong
*Assistant Examiner* — Mario M Velez-Lopez
(74) *Attorney, Agent, or Firm* — Osha Liang LLP (57) ABSTRACT

A method for populating forms based on a user interview. The method includes generating, using a computer processor, binary questions according to a first rule, receiving answers to the binary questions from the user, adjusting, using the computer processor, a binary question based on answers according to a second rule during the user interview, and identifying, using the computer processor, forms from a forms library based on the answers according to a third rule. The method also includes presenting based on the answers, data entry fields of forms to the user in a unified format, where related data entry fields are grouped together to form data entry menus in the unified format, receiving data from the user for the data entry fields, populating a portion of the forms to generate populated forms based on the data, and storing the populated forms in a repository on behalf of the user.

26 Claims, 6 Drawing Sheets

(56) References Cited

U.S. PATENT DOCUMENTS

| | | | |
|---|---|---|---|
| 2008/0072133 A1* | 3/2008 | Eckelman et al. | 715/224 |
| 2008/0249816 A1* | 10/2008 | Khalilian et al. | 705/7 |
| 2009/0210331 A1* | 8/2009 | Boone et al. | 705/32 |
| 2009/0287591 A1* | 11/2009 | Wyle et al. | 705/31 |

OTHER PUBLICATIONS

TurboTax-$2^{nd}$, TurboTax Products Tax Year 2007, Intuit Inc., 2007 Edition, pp. 1-8.*

PCMAG.com, TurboTax Premier 2008—Deeper definitions, Jan. 24, 2009, pp. 1-3 http://web.archive.org/web/20090124060119/http://www.pcmag.com/slideshow_viewer/0,1205,l%253D236106%2526a%253D235974%2526po%253D3,00.asp?p=y.* eHow.com How to File Tax Returns in Two States, Jun. 24, 2008, pp. 1-3 http://web.archive.org/web/20080624020833/http://www.ehow.com/how_9717_file-tax-returns.html?*

* cited by examiner

Step 1: Tell Us About You 2008

Your Personal Info

First Name: Ken
M.I.:
Last Name: Mori
Jr., Sr., etc.:

Date of Birth: 09/09/1970
Social Security #: 123-12-3123
Occupation: Engineer

Mailing Address

Street Address: 111 Main St.
Apt. #:
City: San Diego
State: CA
ZIP Code: 92122

Phone Number: (858) 123-1234

We Also Need to Know...

Can someone else (parents, other relatives) claim you as a dependent? ○ Yes ● No
Did you file a California tax return last year? ○ Yes ● No
Do you want to donate $3 to the Presidential Election Campaign Fund? ○ Yes ● No Answer Fields 411

Partial Screenshot 401

Your Family

1. Were you married as of December 31, 2008? ○ Yes ○ No
2. Did you support children or other dependents? ○ Yes ○ No Binary Questions 412

Partial Screenshot 402

Screenshots 400

FIG. 4

Tell Us About Your Dependent

If your child is under 18, lives with you, and is supported by you financially, then he or she is considered a dependent. And that's a good thing, because dependents give you a tax break. Other people, such as relatives, may also qualify as a dependent. Learn More

| First Name | M.I. | Last Name | Jr., Sr., etc. |
|---|---|---|---|
| John | | Mori | |

Date of Birth: 09/09/2005  Social Security #: 531-12-3123  Relationship: Son

What is this person's citizenship status?
( • ) U.S. citizen or resident  ( ) Resident of Canada or Mexico  ( ) Neither — Binary Questions 501 —

| | | |
|---|---|---|
| Is this person your child who was a full-time student in 2008? Explain This | ○ Yes | ● No |
| Is this person your dependent child who lived with your divorced or separated spouse for more than half the year in 2008? Explain This | ○ Yes | ● No |
| Is this person permanently and totally disabled? | ○ Yes | ● No |
| Did this person pay for more than half of his or her own expenses? Explain This | ○ Yes | ● No |
| Did this person have gross income (income before taxes or expenses are deducted) of more than $3,500 in 2008? Explain This | ○ Yes | ● No |
| Did this person file a joint 2008 tax return? | ○ Yes | ● No |
| Did this person pass away in 2008? | ○ Yes | ● No |
| Did you pay child or dependent care expenses for this person in 2008? Explain This | ● Yes | ○ No |

How much did you pay in child and dependent care expenses that went toward care in 2008? [____]

What percentage of time did you have physical custody of this person in 2008? Explain This [____] ← Data Entry Field 502

How long did this person live with you in the U.S. in 2008? [ The whole year ▼ ]

Note: If this was your child who was born or died in 2008, see more info.

Screenshot 500

UNIFIED DATA ENTRY FOR GENERATING MULTIPLE FORMS

BACKGROUND

Many application forms are commonly issued by a private entity or a government agency for a person to complete from time to time, such as a tax return filing form (e.g., Federal tax return form 1040, California state tax return form 540, etc.), a financial account application form (e.g., a bank account application form, a credit card application form, a mortgage application form, etc.), and many other application forms (e.g., an insurance application form, a club membership application form, a child adoption application form, etc.). Each of these forms has different appearance and style but generally a common set of data is requested. Accordingly, the user is required to fill out similar (repeated) information in completing various forms.

SUMMARY

In general, in one aspect, the invention relates to a method for populating forms based on a user interview. The method includes generating, using a computer processor, a plurality of binary questions according to a first rule, receiving answers to the plurality of binary questions from the user; adjusting, using the computer processor, at least one of the plurality of binary questions based on at least one of the answers according to a second rule during the user interview, identifying, using the computer processor, a plurality of forms from a forms library based on the at least one of the answers according to a third rule, presenting, at least partially based on the answers, a plurality of data entry fields of the plurality of forms to the user in a unified format, wherein related data entry fields of the plurality of data entry fields are grouped together to form a plurality of data entry menus in the unified format, receiving data from the user for the plurality of data entry fields, populating at least a portion of the plurality of forms to generate a plurality of populated forms based on the data, and storing the plurality of populated forms in a repository on behalf of the user.

In general, in one aspect, the invention relates to a computer readable medium storing instructions for populating forms based on a user interview. The instructions when executed by a computer processor comprising functionality for identifying a plurality of forms from a forms library, generating a plurality of binary questions based on the plurality of forms according to a first rule, receiving answers to the plurality of binary questions from the user, presenting, at least partially based on the answers, a plurality of data entry fields of the plurality of forms to the user in a unified format, wherein related data entry fields of the plurality of data entry fields are grouped together to form a plurality of data entry menus in the unified format, receiving data from the user for the plurality of data entry fields, identifying a context based on at least a portion of the answers and the data according to a context based rule, adjusting at least one of the plurality of data entry fields presented to the user based on the context according to the context based rule, populating at least a portion of the plurality of forms to generate a plurality of populated forms based on the data, and storing the plurality of populated forms in a repository on behalf of the user.

In general, in one aspect, the invention relates to a system for populating forms based on a user interview. The system includes a repository for storing a forms library and a rule set, an interview module executing on a computer processor and configured to present a plurality of binary questions to a user and receive answers from the user during the user interview, an interview menu generator executing on a computer processor and configured to generate the plurality of binary questions according to a first rule of the rule set and adjust, during the user interview, at least one of the plurality of binary questions based on at least one of the answers according to a second rule of the rule set, and a memory storing instructions when executed by the computer processor comprising functionality for identifying a plurality of forms from the forms library based on the at least one of the answers according to a third rule of the rule set, presenting, at least partially based on the answers, a plurality of data entry fields of the plurality of forms to the user in a unified format, wherein related data entry fields of the plurality of data entry fields are grouped together to form a plurality of data entry menus in the unified format, receiving data from the user for the plurality of data entry fields, populating at least a portion of the plurality of forms to generate a plurality of populated forms based on the data, and storing the plurality of populated forms in the repository on behalf of the user.

Other aspects of the invention will be apparent from the following description and the appended claims.

BRIEF DESCRIPTION OF DRAWINGS

FIGS. 3-5 depict exemplary screenshots in accordance with one or more embodiments of the invention.

DETAILED DESCRIPTION

Specific embodiments of the invention will now be described in detail with reference to the accompanying figures. Like elements in the various figures. are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to generate and present a set of menus (e.g., questionnaires) in an unified format to interview a user for gathering necessary data to populate or complete a set of forms for the user. In one or more embodiments, the set of menus are generated based on structural information of the set of forms. In one or more embodiments, the set of menus used in the interview are adjusted based on detecting a pre-defined (i.e., pre-determined) context from the user answer and/or user data.

Figure 1:
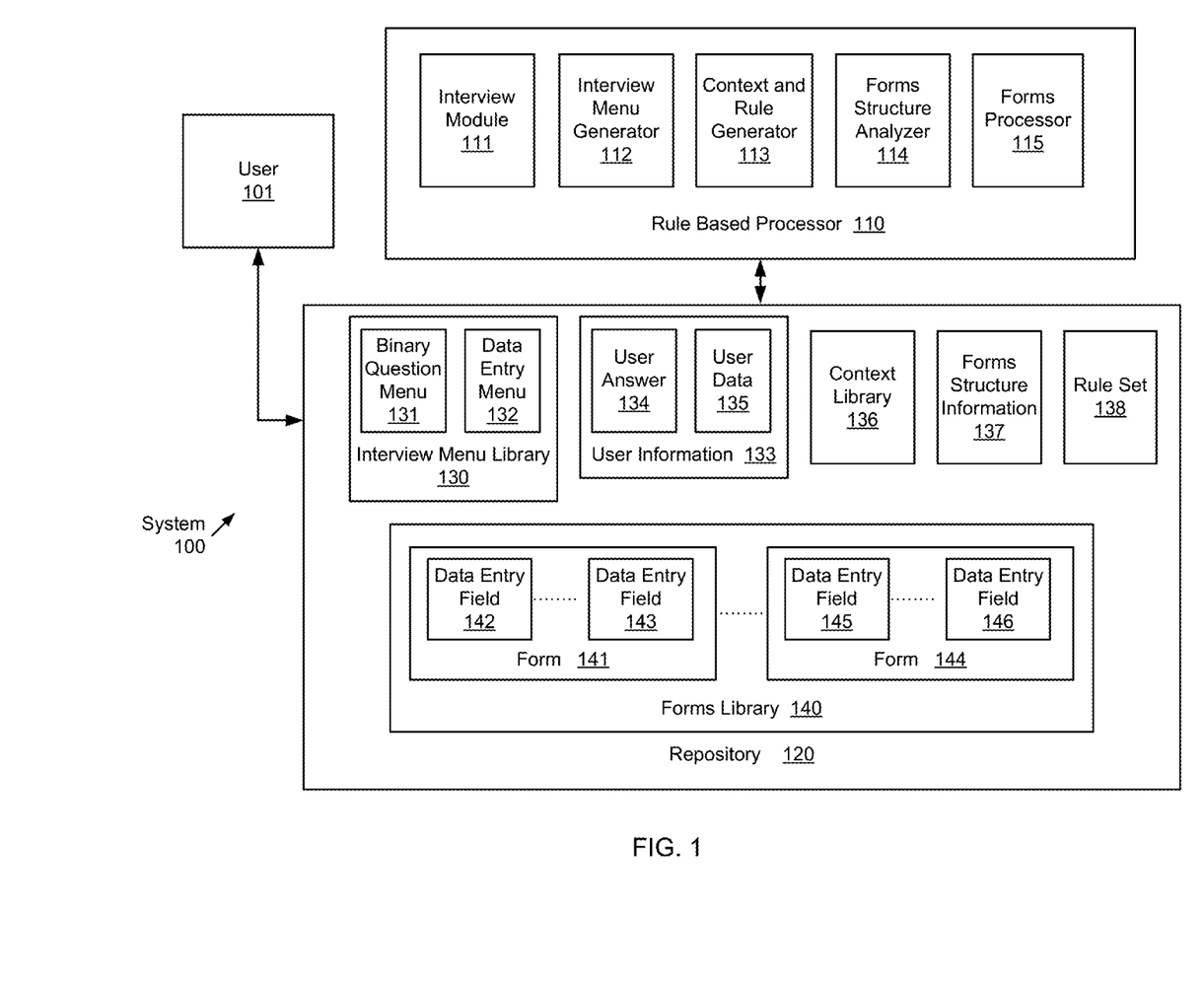
FIG. 1 depicts a schematic block diagram of a system in accordance with one or more embodiments of the invention.

FIG. 1 depicts a schematic block diagram of a system (100) in accordance with one or more embodiments of the invention. Those skilled in the art, having the benefit of this detailed description, will appreciate that the components shown in FIG. 1 may differ among embodiments of the invention, and that one or more of the components may be optional. In one or more embodiments of the invention, one or more of the components shown in FIG. 1 may be omitted, repeated, supplemented, and/or otherwise modified from that shown in FIG. 1.

Accordingly, the specific arrangement of components shown in FIG. 1 should not be construed as limiting the scope of the invention.

As shown in FIG. 1, the system (100) includes a user (101), a rule based processor (110), and a repository (120). In addition, the rule based processor (110) includes an interview module (111), an interview menu generator (112), a context and rule generator (113), a forms structure analyzer (114), and a forms processor (115). Further, the repository (120) is shown to store an interview menu library (130) including one or more binary question menu (131) and one or more data entry menu (132), user information (133) including one or more user answer (134) and one or more user data (135), a context library (136), forms structure information (137), a rule set (138), and a forms library (140) including forms (141, 144, etc.) having data entry fields (142, 143, 145, 146, etc.). Although specific number of components are shown in FIG. 1, those skilled in the art will recognize that any number of user, interview menu library, binary question menu, data entry menu, user information, user answer, user data, context library, forms structure information, rule set, forms library, form, data entry field, and/or any other component shown in FIG. 1 may be included in the system (100) without departing from the spirit of the invention.

As shown in FIG. 1, the user (101) may be an individual interacting with the rule based processor (110) to conduct an interview via the binary question menu (131) and/or the data entry menu (132), for himself/herself or on behalf of another person or an entity, to populate or complete forms (e.g., 141, 144, etc.) from the forms library (140). A binary question, which has two possible answers, may be considered as a special type of data entry field. The binary question menu (131) may include one or more menus each having only binary questions while the data entry menu (132) may include one or more menus each having a combination of binary questions and other data entry fields.

In one embodiment, the forms library (140) may be pre-configured. For example, the forms (141, 144, etc.), and any of optionally associated interview menu library (130), context library (136), forms structure information (137), and/or rule set (138), may be provided together with the rule based processor (110) to the user (101). In other embodiments, the forms library (140) may be configured by the user (101). For example, the forms (141, 144, etc.) may be caused to be imported into the forms library (140) based on user inputs while the interview menu library (130), context library (136), forms structure information (137), and/or rule set (138) may be adaptively generated by the rule based processor (110) based on the user imported forms and subsequent interactions with the user (101). In one or more embodiments, the forms library (140) may be pre-configured initially and re-configured later by the user (101). For example, the user (101) may delete, add, or modify one or more forms in the forms library (140) from time to time while the interview menu library (130), context library (136), forms structure information (137), and/or rule set (138) may be adaptively adjusted by the rule based processor (110) based on the user introduced changes to the forms library (140).

From time to time, certain forms (e.g., 141 and 144) in the forms library (140) may be selected as the forms to be completed for the user (101). In one or more embodiments, the rule based processor (110) may be configured to receive the selection of the forms (141) and (142) as inputs from the user (101). For example, the user (101) may select the Federal tax return form and the California state tax return form to be completed for him and may input these selections to the rule based processor (110). In one or more embodiments, the rule based processor (110) may be configured to infer, according to the rule set (138), the selection of the forms (141) and (142) during the interaction with the user (101). For example, in a tax return scenario, the Federal tax return form may be selected by default while the selection of the California tax return form may be inferred based on a user data entry relating to the residence address of the user (101). In one or more embodiments, the rule based processor (110) may be configured to infer, according to the rule set (138) during the interaction with the user (101), the selection of additional necessary forms to expand the initial user selection. For example, after the user (101) inputs the selection of Federal tax return form and the California tax return form, the selection of an additional Oregon state income tax return form may be inferred based on a user data entry relating to a second home of the user (101).

As shown in FIG. 1, the set of forms (141, 144, etc.) may include multiple data entry fields (142, 143, 145, 146, etc.). In one or more embodiments, the structure of the forms in the forms library (140) may be represented by the forms structure information (137), which may describe number counts, associated attributes (physical size, logical relationships, semantic intent, etc.), and other relevant information of these data entry fields. For example, the forms structure information (137) may be metadata describing the set of forms.

In many cases, certain binary questions and/or data entry fields in a form may be related. For example, with a "YES" answer to a "YES/NO" question, a portion of the data entry fields (142, 143, etc.) may become mandatory for the form (141) to be completed while a "NO" answer may cause the same portion to be optional or unnecessary. In another example, depending on the data entry to certain data entry field (142), another data entry field (143) may become mandatory or optional. Similarly, certain data entry fields or binary questions in multiple forms may also be related. For example, they may be common in multiple forms. In another example, depending on the data entry/answer to certain data entry field/binary question (142) in the form (141), another data entry field/binary question (145) may become mandatory or optional in another form (144). In one or more embodiments, these various relationships in a form (e.g., 141 or 144) or among multiple forms (e.g., 141 and 144) are included in the forms structure information (137).

Further as shown in FIG. 1, the rule based processor (110) may be implemented in hardware, software, or combinations of hardware and software in different embodiments of the invention. In one or more embodiments, the rule based processor (110) may be configured to analyze one or more structures of data entry fields (142, 143, 145, 146, etc.) in a set of forms (141, 144, etc.) in the forms library (140) to generate forms structure information (137) and further generate pre-determined contexts in the context library (136) and pre-determined rules in the rule set (148) based on the forms structure information (137). In addition, the rule based processor (110) may be configured to interview the user (101) in an adaptive manner based on the context library (136) and the rule set (138) to identify a set of forms that the user (101) needs to complete and further gather necessary data from the user (101) to populate the set of forms automatically. In one or more embodiments, the rule based processor (110) may be configured to populate a portion of the set of forms identified based on the context library (136) and the rule set (138). For example, the user interview may be conducted using various input/output means known in the art to present the binary question menu (131) and the data entry menu (132) from the interview menu library (130), corresponding to the selected forms, to the user (101) and receive user answer (134) and user data (135) from the user (101) as a response. Depending on a context detected in the response, the rule based processor (110) may populate an appropriate portion of the selected forms.

Generally speaking, rule-based methods instantiate rules when activated by conditions in a set of data. Such conditions may be referred to as contexts. When a context is detected, a corresponding rule will be selected and applied. In one or more embodiments, the context may be defined based on one or more answers in the user answer (134) and/or one or more data in the user data (135). In one or more embodiments, the rule based processor (110) may be configured to modify, augment, consolidate, reduce, or otherwise adjust the binary question menu (131) and/or the data entry menu (132) during the interview in the adaptive manner based on a match of a condition in the user answer (134) and/or the user data (135), as received during the interview, to a pre-determined context in the context library (136). For example, the context of the user (101) being a head of household with child care responsibility may be inferred based on a user data entry relating to the number of dependents claimed in tax deduction. Once the user data (135) is detected to match such a pre-determined context in the context library (136), an additional menu relating to child care expense may be added by the rule based processor (110) to the interview.

In one or more embodiments, the rule based processor (110) may be configured to format the binary question menu (131) and/or the data entry menu (132) in a unified format such that related data entry fields in all the selected forms are grouped together. For example, all necessary information required to calculate a common aspect of Federal tax deduction, California state tax deduction, and Oregon state tax deduction may be consolidated in one data entry menu of the data entry menu (132). In another example, each top level menu may be one of the binary question menu (131) while one or more of the data entry menu (132) is presented to the user (101) as lower level menus initiated based on a condition (e.g., a context) of the user answers to the binary questions in the top level menus. In yet another example, the lower level menus may be organized in multiple levels (e.g., nested levels) where one lower level menu may be initiated based on a condition (e.g., a context) of a combination of the user answers and data entry responding to another lower level menu.

In one or more embodiments, the various functionalities of the rule based processor (110) described above may be performed, based on the rule set (138), using the interview module (111), the interview menu generator (112), the context and rule generator (113), the forms processor (115), and the forms structure analyzer (114).

In one or more embodiments, the forms structure analyzer (114) may be configured to analyze the set of forms (141, 144, etc.) in the forms library (140) for identifying various relationships among the data entry fields (142, 143, 145, 146, etc.) to generate and/or expand the forms structure information (137). As described above, a portion of the forms structure information (137) may be pre-configured before further expansion by the forms structure analyzer (114). For example, in the scenario of completing the tax return forms, the pattern of general sharing of common information between the Federal tax return form and state tax return form may be pre-configured in the forms structure information (137). In another example, occurrences or annual updates of common data entry fields relating to child care expense deductions may be identified in the Federal tax return form and other state tax return forms by the forms structure analyzer (114). In yet another example, the relationship between a question of whether the user (101) has a second home or not and a section of questions/data entry fields relating to real estate properties may be identified in one form or across multiple forms by the forms structure analyzer (114).

In one or more embodiments, the context and rule generator (113) may be configured to generate and/or expand the context library (136) and the rule set (138) based on the forms structure information (137). As described above, a portion of the context library (136) and/or the rule set (138) may be pre-configured before further expansion by the context and rule generator (113). For example, a pre-configured rule in the rule set (138) may state that the Federal tax return form is required by default. In another example, the rule to present child care expense deduction questions upon detecting the age of an dependent may be generated or updated by the context and rule generator (113). In yet another example, the decision rule to format the child care expense deduction data entry fields into a single or multiple interview menus may be generated depending on the number of data entry fields identified in the forms structure information (137) and the layout size limitation of the individual menus.

In one or more embodiments, the interview menu generator (112) may be configured to generate, expand, modify, or otherwise adjust the binary question menu (131) and/or the data entry menu (132) according to the rule set (148). For example, a single or multiple interview menus may be generated to group the child care expense deduction data entry fields required by both Federal tax return form and other state tax return forms in a unified format by the interview menu generator (112).

In one or more embodiments, the interview module (111) may be configured to present, at least a portion corresponding to the selected forms, the binary question menu (131) and/or the data entry menu (132) to the user (101) and receive the user answer (134) and the user data (135) as a response. Furthermore, the interview module (111) may be configured to identify a context from the user answer (131) and/or the user data (135) as received during the interview to select and apply a corresponding rule from the rule set (148). In one or more embodiments, the corresponding rule may relate to identify or further identify the necessary forms to be completed for the user (101). For example, a second state tax return form may be identified as necessary based on a user answer relating to a second home and the associated address. In one or more embodiments, the corresponding rule may relate to adjusting the binary question menu (131) and/or the data entry menu (132) for the user interview. For example, the data entry menu relating to real estate properties may be adjusted based on a user answer relating to the second home.

In one or more embodiments, the forms processor (115) may be configured to populate at least a portion of the forms (141, 144, etc.) based on the user answer (134) and the user data (135). In one or more embodiments, the forms processor (115) may be configured to correlate the binary question menu (131), the data entry menu (132), and various data entry fields in the forms (141, 144, etc.) for populating the forms. In one or more embodiments, the forms processor (115) may be configured to perform such correlation based on the forms structure information (137). In one or more embodiments, the forms processor (115) may be configured to store the populated forms in the repository (120). For example, the forms (141, 144, etc.) may include both blank forms (or form templates) as well as populated forms.

Although not specifically shown in FIG. 1, those skilled in the art will appreciate that any formats (e.g., a table, a list, a linked list, a database, a hierarchical data structure, etc.) or organizational structure/scheme (e.g., item-based, context-based, etc.) may be used for storing the interview menu library, binary question menu, data entry menu, user information, user answer, user data, context library, forms structure information, rule set, forms library, form, and/or data entry field in the repository (120) without departing from the spirit of the invention.

Figure 2:
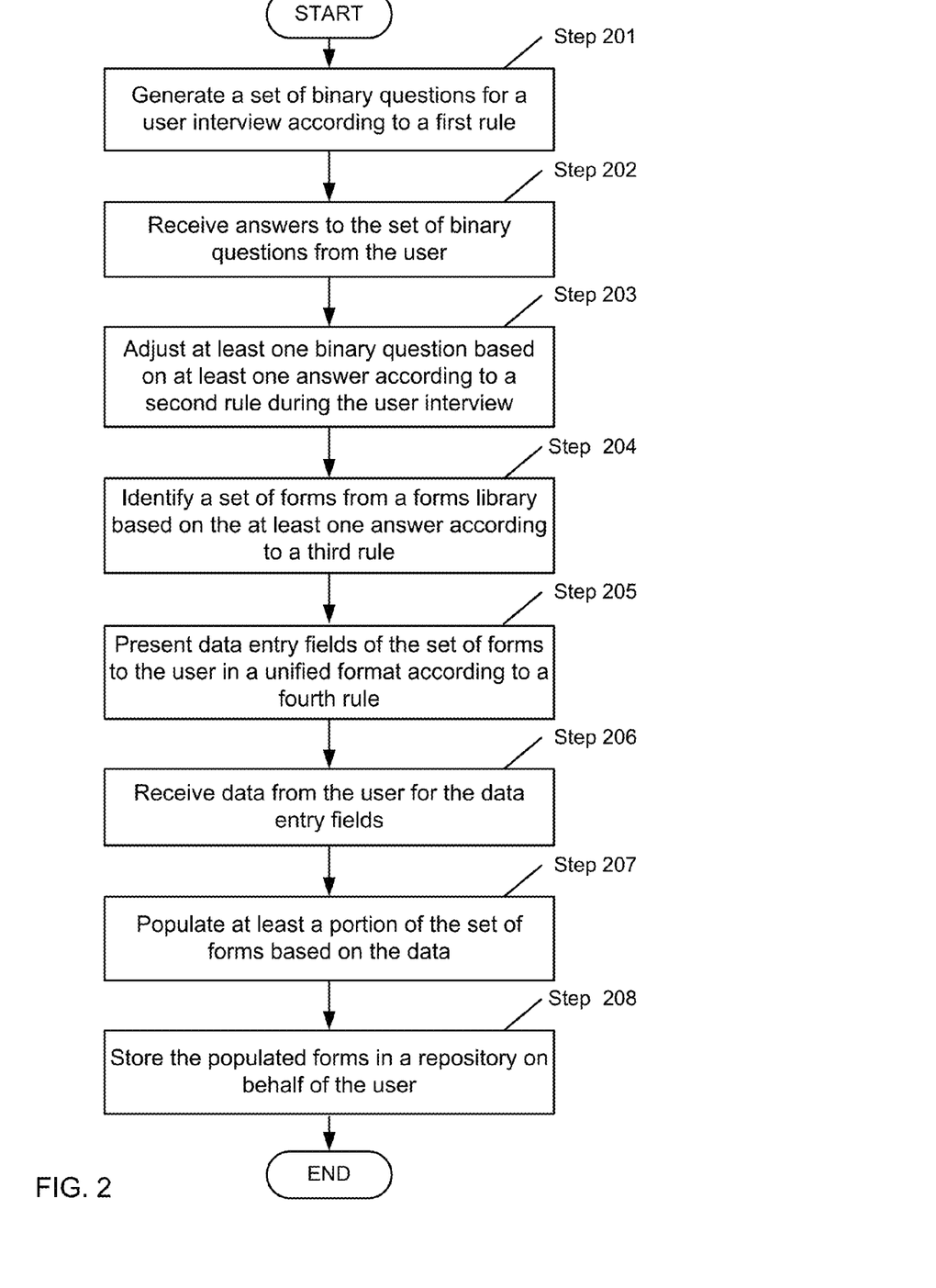
FIG. 2 depicts a flowchart of a method in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. Furthermore, one or more of the steps shown in FIG. 2 are performed on a computer processor, such as the computer processor described as part of the computer system of FIG. 6.

In one or more embodiments of the invention, the method depicted in FIG. 2 may be practiced using system (100) described with respect to FIG. 1. Initially, a set of binary questions may be generated according to a first rule (Step 201). In one or more embodiments, the set of binary questions may be used in an interview to collect information from the user for automatically populating a set of forms on behalf of the user. In particular, the binary questions may be generated so as to facilitate the collection of all required information for populating the set of forms. For example, data entry fields may be organized, according to answers to the binary questions, in a unified format for collecting the required information. In the scenario of completing tax return forms, an example rule may generate a binary question regarding marital status of the user when required marital status related deduction information are detected in the set of tax return forms.

In Step 202, answers to the set of binary questions may be received from the user. In one or more embodiments, one or more data entry menus may be linked with each of the binary questions and be added to the interview when the answer of the corresponding binary question matches a pre-determined answer. For example in the scenario of completing tax return forms, a marital status related deduction data entry menu may be added to the interview when the user answers "Yes" to the binary question regarding marital status of the user.

In Step 203, at least one binary question may be added, deleted, modified, or otherwise adjusted based on at least one answer according to a second rule during the user interview. In one or more embodiments, the set of binary questions may be adjusted if a context is identified by comparing at least one of the answers to a pre-defined context library. For example in the scenario of completing tax return forms, if the context of the user as not having any dependent is identified from the answer to a first binary question "Did you support children or other dependents" is "No," a list of other binary questions relating to the topic of dependents may be eliminated from the interview. An example rule may relate the first binary question to the list of other binary questions according to a business logic.

In Step 204, a set of forms may be identified by the rule based processor from a forms library based on the at least one answer according to a third rule. For example in the scenario of completing tax return forms, the California state tax return form and the Oregon state tax return form may be identified as the selected forms when the answers indicate the user as a California resident with a second home in Oregon. In one or more embodiments, the user may make an initial selection of the forms while an additional form may be added to the user selected forms based on an identified context during the course of the interview. In the example above, the user may initially selected the Federal tax return form and the California state tax return form while the Oregon state tax return form is added when the context of the user owning a second home is identified, for example based on a context based rule.

In Step 205, data entry fields of the set of forms may be presented to the user in a unified format where related data entry fields are grouped together. For example in the scenario of completing tax return forms, all data entry fields for marital status related deduction required by Federal tax return form, California state tax return form, and Oregon state tax return form are grouped together in one data entry menu while all data entry fields for dependent related deduction required by these tax return forms are grouped together in another data entry menu. In one or more embodiments, data entry fields of the set of forms may be organized in the unified format according to a fourth rule. An example rule may identify the grouping according to a business logic associated with the set of forms and partition each group of data entry fields into one or more data entry menus based on pre-determined menu layout size limitation.

In Step 206, data may be received from the user for the data entry fields. In Step 207, at least a portion of the set of forms may be populated based on the data. In Step 208, the populated forms may be stored in a data repository on behalf of the user. In one or more embodiments, the portion may be selected by the user. In one or more embodiments, an appropriate portion of the set of forms may be identified to be populated based on an identified context according to a context based rule.

In one or more embodiments, the first, second, third, fourth, and/or context based rules may be part of a rule set driving a rule based processor (e.g., as described in reference to FIG. 1) to perform the method of FIG. 2. In one or more embodiments, the rule set may be generated by at least analyzing structural information (e.g., relationship among data entry fields) of the set of forms.

Figure 3:
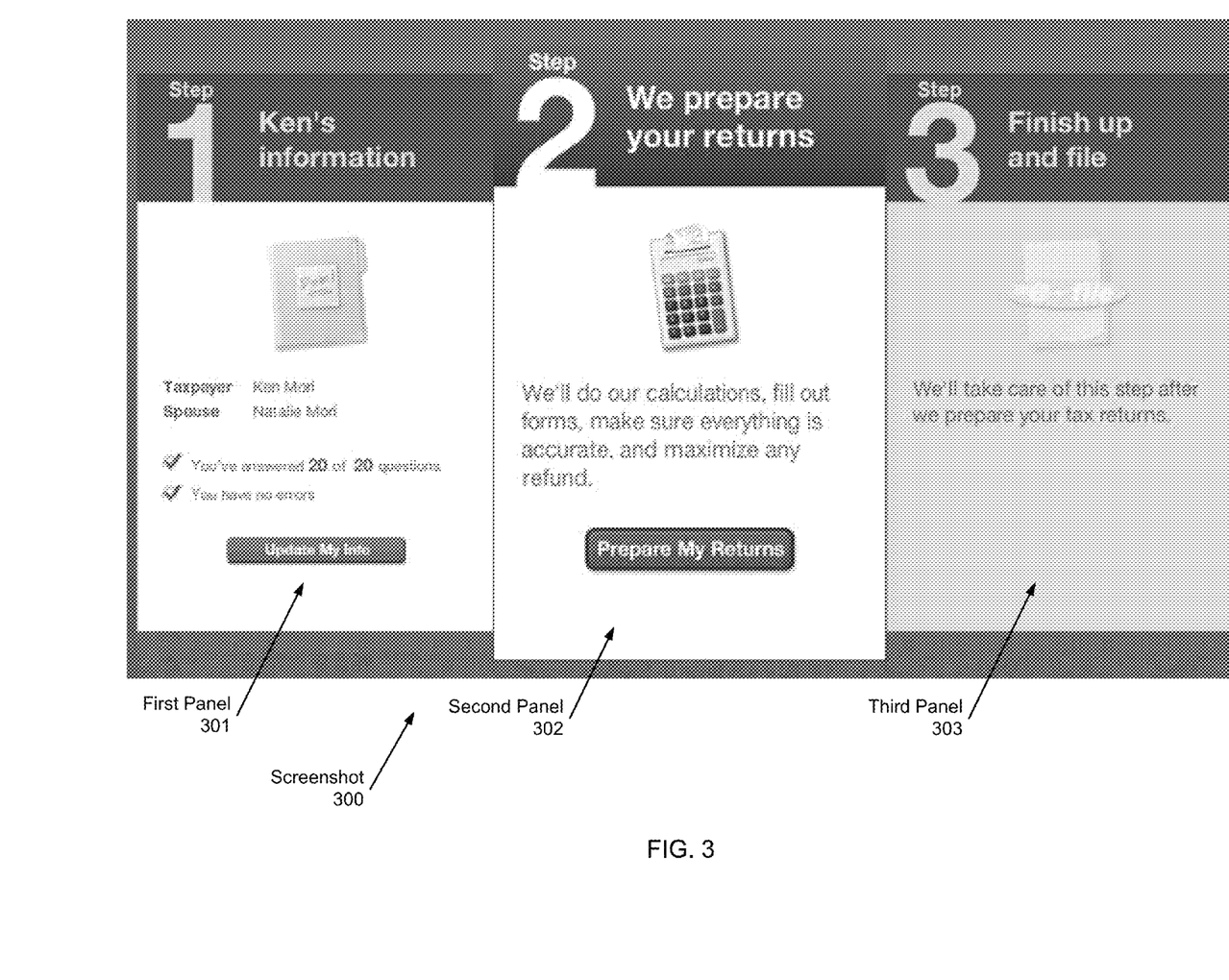
Figure 4:
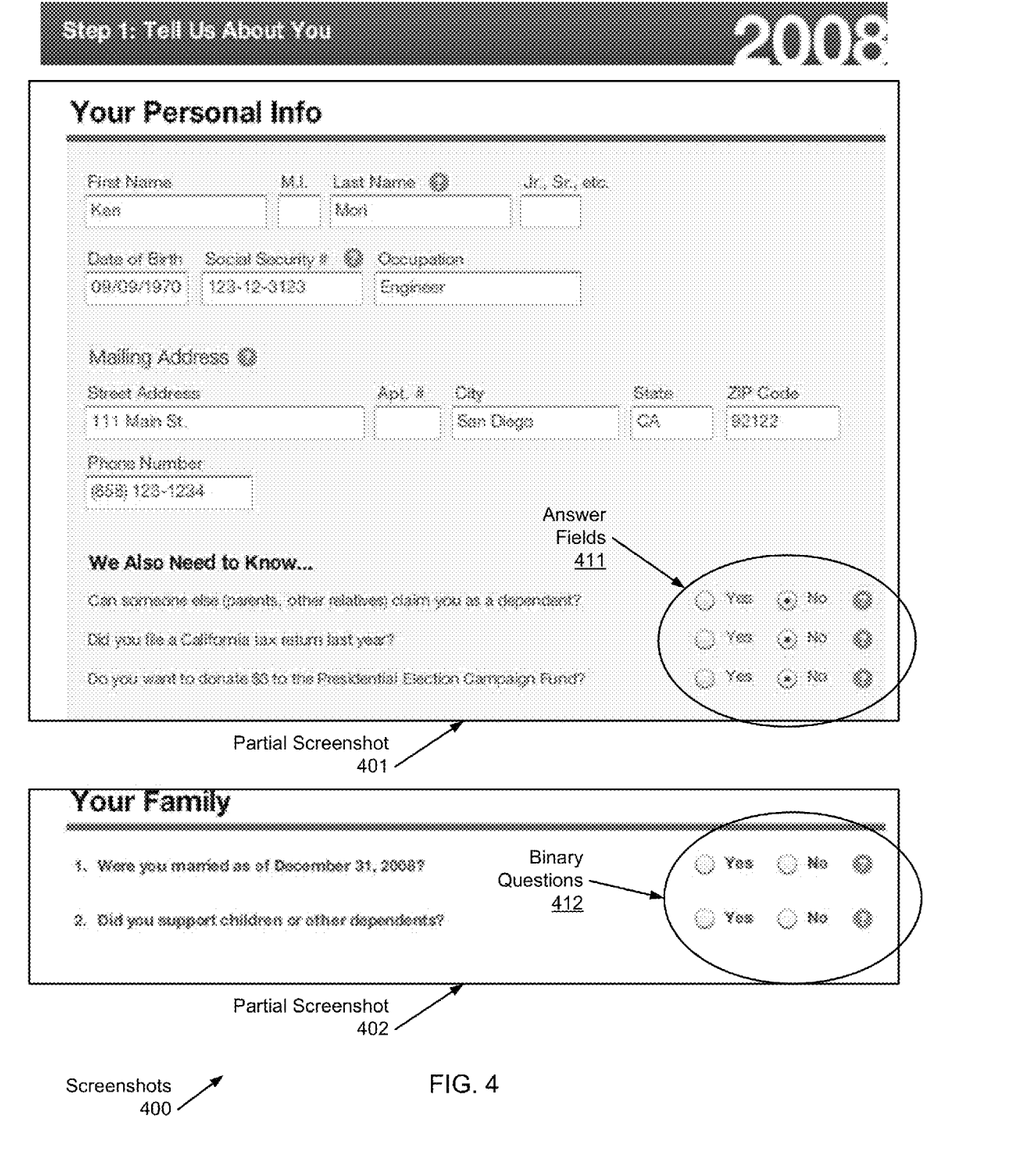

FIGS. 3-5 depict an example in accordance with one or more embodiments of the invention. The example depicts a user preparing a Federal tax return form and a California state tax return form using a system described in reference to FIG. 1 based on the method described in reference to FIG. 2 above. The example is not intended to limit the scope of the invention.

FIG. 3 depicts a screenshot (300) presented by the rule based processor to guide a user named Ken through a user interview (to be initiated via the first panel (301)) such that the tax return forms may be populated and completed automatically (to be initiated via the second panel (302)) and subsequently filed (to be initiated via the third panel (303)). As shown in FIG. 3, Ken has completed the user interview (Step 1 "Update My Info") indicated by the check marks noting that 20 of 20 questions have been answered and that no errors is detected. In addition, the second panel (302) of the screenshot is enlarged indicating that Step 2 "Prepare My Returns" is currently active. Although not specifically shown, the third stage of filing the prepared tax return forms (Step 3 "Finish up and file") may be initiated based on user activation when the tax return forms are completed in the Step 2, in which case and time the third panel (303) may be highlighted and enlarged.

FIG. 4 depicts a portion of a series screenshots (400) that are presented to Ken during the user interview, which was initiated via the first panel (301) of FIG. 3. As shown, this series of screenshots (400) is entitled "Step 1: Tell Us About You" for tax year 2008. The series of screenshots (400) correspond to the interview menus described in reference to FIG. 1 above. As shown in FIG. 4, a first menu "Your Personal Info" is presented in the partial screenshot (401). In addition, a portion of a second menu "Your Family" is presented in the partial screenshot (402). Additional menus "Your Income" and "Checks for Deductions and Credits" are not shown so as not to obscure the clarity in FIG. 4. Generally speaking, each menu may include binary questions, data entry fields, or combinations of both. For example, the first menu in screenshot (401) includes both data entry fields such as first name, last name, date of birth, mailing address, etc. as well as the binary questions with Yes/No answer fields (411). Although not shown or not shown in its entirety, the other menus in this example include only binary questions. For example, the partial screenshot (402) shows a portion of the binary questions (412) in the second menu.

As described in reference to FIGS. 1 and 2 above, additional menus may be presented during the interview in an adaptive manner. Said in other words, depending on the answer or data entry corresponding to a binary question or a data entry field in one of the menus, additional menus may be added to the user interview. For example, if Ken answers "Yes" to the first question "Were you married as of Dec. 31, 2008?" of binary questions (412) in the second menu, an additional menu "Tell Us About Your Spouse" (not shown) will be presented to Ken. In another example, if Ken answers "Yes" to the second question "Did you support children or other dependents?" of binary questions (412) in the second menu, an additional menu "Tell Us About Your Dependent," as shown in FIG. 5, will be presented to Ken.

In the example described above, all data entry fields, except those related to the user identification and address information included in the first menu, are grouped in groups of related fields and presented in lower level menu structures. These lower level menu structures are adaptively generated and added to the interview based on answers to the binary questions in the four top level menus (e.g., the 20 questions) described above or other preceding lower level menus. This format is an example of the unified format described in reference to FIGS. 1 and 2 above.

FIG. 5 shows a screenshot (500) of the menu "Tell Us About Your Dependent," which includes the binary questions (501) and other data entry fields that are all related to the topic of the dependent. In particular, the data entry field (502) relating to "What percentage of time did you have physical custody of this person in 2008?" is specific to California state tax return form while other data entry fields are common for the Federal tax return form and other state tax return forms. This is an example of consolidating questions/data entry fields from different forms (i.e., the Federal tax return form and the California tax return form) in a group of related information.

As described above, the rule based processor determines which state topics (e.g., address information) can be derived from their federal counterparts and which need to be separately incorporated (e.g., the data entry field (502)) into the menus or question list by analyzing the Federal tax return form and the California state tax return form and generating pre-determined rules. Any question or data entry field that is applicable to more than one form is only displayed once to eliminate redundancy. For a given context (e.g., marital status, dependent status, etc.), the rule based processor determines if additional secondary form (e.g., California state tax return form) requires unique information. If so the unique data entry field or question is incorporated into the menu in a way that is as seamless as possible. In a different example, the address information data entry fields do not separate out California specific fields. Instead the set of data entry fields for address information include the California specific fields and Ken simply fills out the data without having to consider its intended mapping to a particular form. This is achieved by eliminating the complexities of an unique form fields.

For any outlier questions that do not apply to an existing context, they are grouped together within their own context(s). For the experience this ensure three key benefits to the user: (1) redundant data entry is eliminated; (2) some percentage (likely a high percentage) of data can be asked for in the correct context (e.g., California specific address information can be asked for within the main address information collection menu); and (3) any other data is collected in a context which makes it clear that the data is in a distinguishable category.

Figure 6:
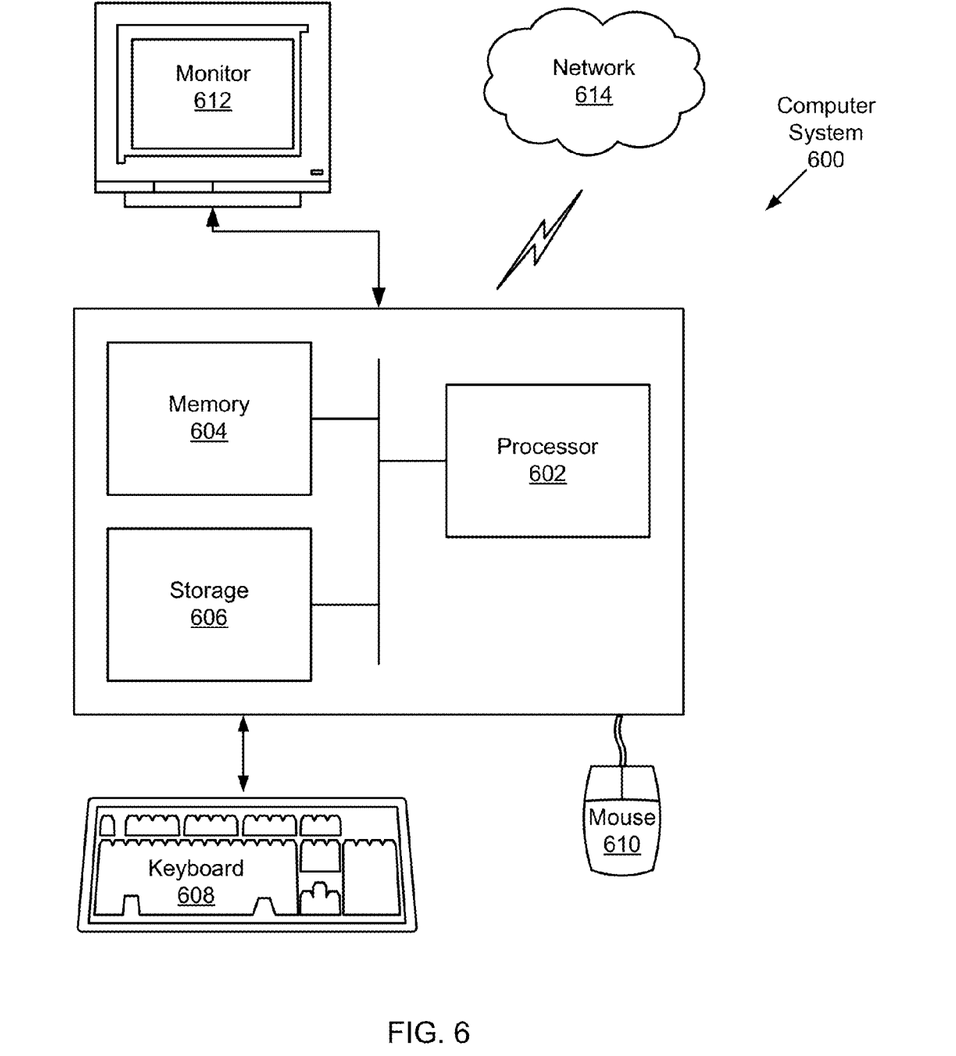
FIG. 6 depicts a computer system in accordance with one or more embodiments of the invention.

Embodiments of the invention (including one or more of the steps shown and described in conjunction with FIG. 2) may be implemented on virtually any type of computer regardless of the platform being used. For example, as shown in FIG. 6, a computer system (600) includes one or more computer processor(s) (602), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., various components of FIG. 1) may be located on a different node within the distributed system. In one embodiments of the invention, the node corresponds to a computer system. Alternatively, the node may correspond to a computer processor with associated physical memory. The node may alternatively correspond to a computer processor with shared memory and/or resources. Further, software instructions for performing embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for populating forms based on a user interview, comprising:
   generating, using a computer processor, a plurality of binary questions according to a first rule to form a top level menu;
   receiving a plurality of binary answers corresponding to the plurality of binary questions from the user;
   adjusting, using the computer processor, at least one of the plurality of binary questions based on the plurality of binary answers according to a second rule during the user interview;
   identifying, using the computer processor, a plurality of forms from a forms library based on the plurality of binary answers according to a third rule, wherein the plurality of forms comprises a Federal tax return form and a state tax return form associated with a first State;
   extracting, based on the plurality of binary answers, a plurality of data entry fields from the plurality of forms by at least:
      excluding any duplicate data entry field in the plurality of forms, and
      combining at least two related data entry fields based on a pre-determined criterion;
   presenting the plurality of data entry fields to the user in a unified format by:
      grouping related data entry fields of the plurality of data entry fields based on the plurality of binary answers to form a plurality of data entry menus, wherein the plurality of data entry menus are organized as multiple levels in lower level menu structures associated with the top level menu; and
      selectively presenting the plurality of data entry menus to the user based on a condition of the plurality of binary answers;
   receiving data from the user for the plurality of data entry fields, wherein the lower level menu structures of the unified format are further generated and added to the user interview based on the data, wherein further generating the lower level menu structures of the unified format comprises:
      identifying an additional state tax return form associated with a second State based on the data; and
      grouping additional binary questions associated with all data entry fields for a particular deduction required by the Federal tax return form, the State tax return form, and the additional State tax return form together in a single data entry menu for the particular deduction;
   populating at least a portion of the plurality of forms to generate a plurality of populated forms; and
   storing the plurality of populated forms in a repository on behalf of the user.

2. The method of claim 1, further comprising:
   analyzing, using the computer processor, a structure of the plurality of forms to generate at least one selected from a group consisting of the first rule, the second rule, and the third rule.

3. The method of claim 1, wherein at least a portion of the plurality of binary questions are embedded in at least one of the plurality of data entry menus.

4. The method of claim 1, further comprising:
   analyzing, using the computer processor, a structure of the plurality of forms to generate a context based rule; and
   identifying a context based on at least a portion of the plurality of binary answers and the data,
   wherein presenting the plurality of data entry fields to the user in the unified format comprises presenting at least one of the plurality of data entry menus to the user based on the context.

5. The method of claim 1, further comprising:
   analyzing, using the computer processor, a structure of the plurality of forms to generate a context based rule;
   identifying a context based on at least a portion of the plurality of binary answers and the data; and
   adjusting, using the computer processor, at least one of the plurality of data entry fields presented to the user based on the context according to the context based rule.

6. The method of claim 1, further comprising:
   analyzing, using the computer processor, a structure of the plurality of forms to generate a context based rule;
   identifying a context based on at least a portion of the plurality of binary answers and the data; and
   further identifying the plurality of forms from the forms library based on the context according to the context based rule.

7. The method of claim 1, further comprising:
   analyzing, using the computer processor, a structure of the plurality of forms to generate a context based rule;
   identifying a context based on at least a portion of the plurality of binary answers and the data; and
   identifying the portion of the plurality of forms to be populated based on the context according to the context based rule.

8. The method of claim 1, wherein the plurality of forms comprises at least one selected from a group consisting of a federal income tax return form, a state income tax return form, a child adoption application form, a mortgage application form, and a credit card application form.

9. A computer readable medium storing instructions for populating forms based on a user interview, the instructions when executed by a computer processor comprising functionality for:
   generating a plurality of binary questions according to a first rule to form a top level menu;
   receiving a plurality of binary answers corresponding to the plurality of binary questions from the user;
   adjusting, using the computer processor, at least one of the plurality of binary questions based on the plurality of binary answers according to a second rule during the user interview;
   identifying, using the computer processor, a plurality of forms from a forms library based on the plurality of binary answers according to a third rule, wherein the plurality of forms comprises a Federal tax return form and a state tax return form associated with a first State;
   extracting, based on the plurality of binary answers, a plurality of data entry fields from the plurality of forms by at least:
      excluding any duplicate data entry field in the plurality of forms, and
      combining at least two related data entry fields based on a pre-determined criterion;
   presenting the plurality of data entry fields to the user in a unified format by:
      grouping related data entry fields of the plurality of data entry fields based on the plurality of binary answers to form a plurality of data entry menus, wherein the plurality of data entry menus are organized as multiple levels in lower level menu structures associated with the top level menu; and selectively presenting the plurality of data entry menus to the user based on a condition of the plurality of binary answers;

receiving data from the user for the plurality of data entry fields, wherein the lower level menu structures of the unified format are further generated and added to the user interview based on the data, wherein further generating the lower level menu structures of the unified format comprises:

identifying an additional state tax return form associated with a second State based on the data; and grouping additional binary questions associated with all data entry fields for a particular deduction required by the Federal tax return form, the State tax return form, and the additional State tax return form together in a single data entry menu for the particular deduction;

populating at least a portion of the plurality of forms to generate a plurality of populated forms based on the data; and storing the plurality of populated forms in a repository on behalf of the user.

10. The computer readable medium of claim 9, the instructions when executed by the computer processor further comprising functionality for:

analyzing a structure of the plurality of forms to generate a context based rule;

identifying a context based on at least a portion of the plurality of binary answers and the data according to the context based rule; and adjusting at least one of the plurality of binary questions based on the context according to the context based rule during the user interview.

11. The computer readable medium of claim 9, the instructions when executed by the computer processor further comprising functionality for:

analyzing a structure of the plurality of forms to generate a context based rule;

identifying a context based on at least a portion of the plurality of binary answers and the data according to the context based rule, wherein presenting the plurality of data entry fields to the user in the unified format comprises presenting at least one of the plurality of data entry menus to the user according to the context.

12. The computer readable medium of claim 9, the instructions when executed by the computer processor further comprising functionality for:

analyzing a structure of the plurality of forms to generate a context based rule;

identifying a context based on at least a portion of the plurality of binary answers and the data according to the context based rule; and further identifying the plurality of forms from the forms library based on the context according to the context based rule.

13. The computer readable medium of claim 9, the instructions when executed by the computer processor further comprising functionality for:

analyzing a structure of the plurality of forms to generate a context based rule;

identifying a context based on at least a portion of the plurality of binary answers and the data according to the context based rule; and identifying the portion of the plurality of forms to be populated based on the context according to the context based rule.

14. The computer readable medium of claim 9, wherein the plurality of forms comprises at least one selected from a group consisting of a child adoption application form, a mortgage application form, and a credit card application form.

15. A system for populating forms based on a user interview, comprising:

a repository for storing a forms library and a rule set;

an interview module executing on a computer processor and configured to present a plurality of binary questions as a top level menu to a user and receive a plurality of binary answers from the user during the user interview;

an interview menu generator executing on a computer processor and configured to generate the plurality of binary questions according to a first rule of the rule set and adjust, during the user interview, at least one of the plurality of binary questions based on the plurality of binary answers according to a second rule of the rule set; and a memory storing instructions when executed by the computer processor comprising functionality for:

identifying a plurality of forms from a forms library based on the plurality of binary answers according to a third rule, wherein the plurality of forms comprises a Federal tax return form and a state tax return form associated with a first State;

extracting, based on the plurality of binary answers, a plurality of data entry fields from the plurality of forms by at least:

excluding any duplicate data entry field in the plurality of forms, and combining at least two related data entry fields based on a pre-determined criterion;

presenting the plurality of data entry fields to the user in a unified format by:

grouping related data entry fields of the plurality of data entry fields based on the plurality of binary answers to form a plurality of data entry menus, wherein the plurality of data entry menus are organized as multiple levels in lower level menu structures associated with the top level menu; and selectively presenting the plurality of data entry menus to the user based on a condition of the plurality of binary answers;

receiving data from the user for the plurality of data entry fields, wherein the lower level menu structures of the unified format are further generated and added to the user interview based on the data, wherein further generating the lower level menu structures of the unified format comprises:

identifying an additional state tax return form associated with a second State based on the data; and grouping additional binary questions associated with all data entry fields for a particular deduction required by the Federal tax return form, the State tax return form, and the additional State tax return form together in a single data entry menu for the particular deduction;

populating at least a portion of the plurality of forms to generate a plurality of populated forms; and storing the plurality of populated forms in the repository on behalf of the user.

16. The system of claim 15, further comprising:

a forms structure analyzer executing on a computer processor and configured to analyze a structure of the plurality of forms to generate at least one selected from a group consisting of the first rule, the second rule, and the third rule.

17. The system of claim 15, wherein at least a portion of the plurality of binary questions are embedded in at least one of the plurality of data entry menus.

18. The system of claim 15, further comprising:
a context and rule generator configured to analyze a structure of the plurality of forms to generate a context based rule,
wherein the instructions when executed by the computer processor further comprising functionality for:
identifying a context of at least a portion of the plurality of binary answers and the data,
wherein presenting the plurality of data entry fields to the user in the unified format comprises presenting at least one of the plurality of data entry menus to the user based on the context according to the context based rule.

19. The system of claim 15, further comprising:
a context and rule generator configured to analyze a structure of the plurality of forms to generate a context based rule,
wherein the instructions when executed by the computer processor further comprising functionality for:
identifying a context based on at least a portion of the plurality of binary answers and the data; and
adjusting at least one of the plurality of data entry fields presented to the user based on the context according to the context based rule.

20. The system of claim 15, further comprising:
a context and rule generator configured to analyze a structure of the plurality of forms to generate a context based rule,
wherein the instructions when executed by the computer processor further comprising functionality for:
identifying a context based on at least a portion of the plurality of binary answers and the data; and
further identifying the plurality of forms from the forms library based on the context according to the context based rule.

21. The system of claim 15, further comprising:
a context and rule generator configured to analyze a structure of the plurality of forms to generate a context based rule,
wherein the instructions when executed by the computer processor further comprising functionality for:
identifying a context of at least a portion of the plurality of binary answers and the data, and
identifying the portion of the plurality of forms to be populated based on the context according to the context based rule.

22. The system of claim 15, wherein the plurality of forms comprises at least one selected from a group consisting of a child adoption application form, a mortgage application form, and a credit card application form.

23. The method of claim 1,
wherein the data received from the user for the plurality of data entry fields comprises an answer relating to a second home,
wherein the additional state tax return form is identified based on an address of the second home, and
wherein the particular deduction comprises at least one selected from a group consisting of marital status related deduction and dependent related deduction.

24. The method of claim 1,
wherein the data received from the user for the plurality of data entry fields comprises an answer relating to a second home, and
wherein further generating the lower level menu structures of the unified format comprises adjusting, solely in response to the answer relating to the second home, a data entry menu of the plurality of the data entry menus that is related to real estate properties.

25. The computer readable medium of claim 9, wherein at least a portion of the plurality of binary questions are embedded in at least one of the plurality of data entry menus.

26. The computer readable medium of claim 9, the instructions when executed by the computer processor further comprising functionality for:
analyzing a structure of the plurality of forms to generate at least one selected from a group consisting of the first rule, the second rule, and the third rule.

* * * * *